United States Patent [19]
Imai

[11] 4,101,196
[45] Jul. 18, 1978

[54] OBJECTIVE OPTICAL SYSTEM FOR ENDOSCOPES

[75] Inventor: Toshihiro Imai, Hachiouji, Japan

[73] Assignee: Olympus Optical Co., Ltd., Japan

[21] Appl. No.: 716,804

[22] Filed: Aug. 23, 1976

[30] Foreign Application Priority Data

Aug. 30, 1975 [JP] Japan ................ 50/104521

[51] Int. Cl.² .................. G01B 5/16; G01B 5/14
[52] U.S. Cl. .................. 350/96.31; 350/96.25; 350/175 GN; 128/6
[58] Field of Search ..... 350/96 GN, 96 BC, 175 GN; 128/6

[56] References Cited

U.S. PATENT DOCUMENTS

| | | | |
|---|---|---|---|
| 3,626,194 | 12/1971 | Hirano et al. | 350/96 GN |
| 3,801,181 | 4/1974 | Kitano et al. | 350/96 GN |
| 4,017,150 | 4/1977 | Imai | 350/96 BC |

FOREIGN PATENT DOCUMENTS 2,311,823 9/1973 Fed. Rep. of Germany ....... 350/175 GN

OTHER PUBLICATIONS

Uchida et al. "Optical Characteristics of a Light-Focusing Fiber Guide ..." JEEE Jour of Quan Elec., Vol. QE-6, No. 10, Oct. 1970, pp. 606-612.

*Primary Examiner*—John K. Corbin
*Assistant Examiner*—Rolf Hille
*Attorney, Agent, or Firm*—Cushman, Darby & Cushman

[57] ABSTRACT

An objective optical system for endoscopes comprising a cylindrical light-focusing heterogeneous medium, for which refractive index distribution is expressed by the following formula and which is arranged on the object side of an image-transmitting optical fiber bundle.

$$n = n_0(1 - \tfrac{1}{2}\alpha R^2)$$

3 Claims, 13 Drawing Figures

SPHERICAL ABERRATION

-0.01 0 0.01

ASTIGMATISM

-0.02 0 0.02

LATERAL CHROMATIC ABERRATION

-0.01 0 0.01

SPHERICAL ABERRATION

ASTIGMATISM

LATERAL CHROMATIC ABERRATION

FIG. 5A — SPHERICAL ABERRATION
FIG. 5B — ASTIGMATISM
FIG. 5C — LATERAL CHROMATIC ABERRATION
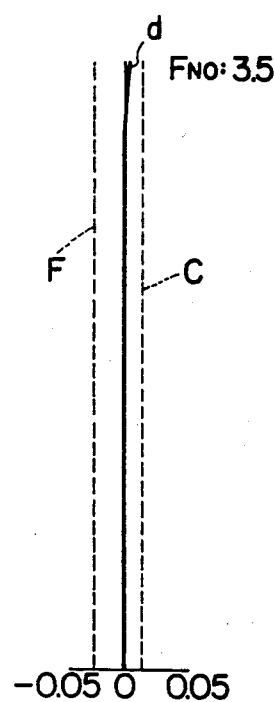
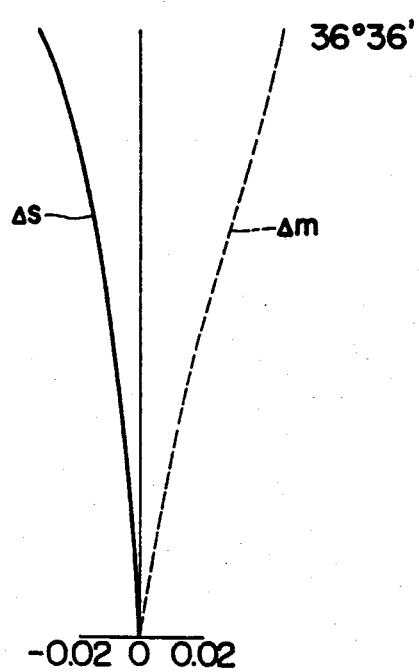
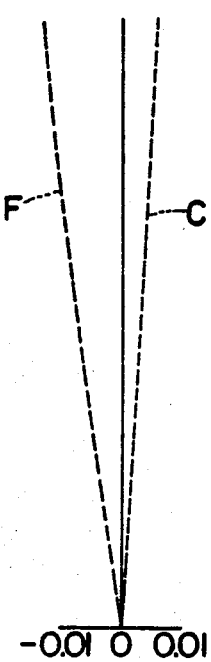

OBJECTIVE OPTICAL SYSTEM FOR ENDOSCOPES

BACKGROUND OF THE INVENTION (a) Field of the invention

The present invention relates to an objective optical system for endoscopes.

(b) Description of the prior art

Optical systems for endoscopes, especially of flexible endoscopes, comprises an objective arranged at the distal end and an optical fiber bundle arranged in rear of the objective and such optical systems are arranged to observe an image of an object by transmitting it by the optical fiber bundle.

In case of such endoscope comprising the optical fiber bundle, however, loss in intensity of light occurs when the light is transmitted by the optical fiber bundle. The above-mentioned loss in intensity of light becomes the smallest when the light enters the optical fiber bundle vertically to the end face of the optical fiber bundle. However, in order to let the light from the object enter vertically to the end face of the optical fiber bundle and to arrange so that a favourable image can be obtained, it is necessary to use an objective of complicated lens configuration.

SUMMARY OF THE INVENTION

It is, therefore, a primary object of the present invention to provide an objective optical system for endoscopes comprising a light-focusing heterogeneous medium in front of the end face of the optical fiber bundle on the incident side.

Another object of the present invention is to provide an objective optical system for endoscopes comprising a light-focusing heterogeneous medium arranged in front of the end face of the optical fiber bundle on the incident side and a negative lens arranged in front of the light-focusing heterogeneous medium and thereby arranged to have a wide field angle and to favourable correct the curvature of field and chromatic aberration.

BRIEF DESCRIPTION OF THE DRAWINGS

FIGS. 5A, 5B and 5C respectively show graphs illustrating aberration curves of Example I;

DETAILED DESCRIPTION OF PREFERRED EMBODIMENTS

Details of the optical system according to the present invention are described below referring to the accompanying drawings.

Figure 1:
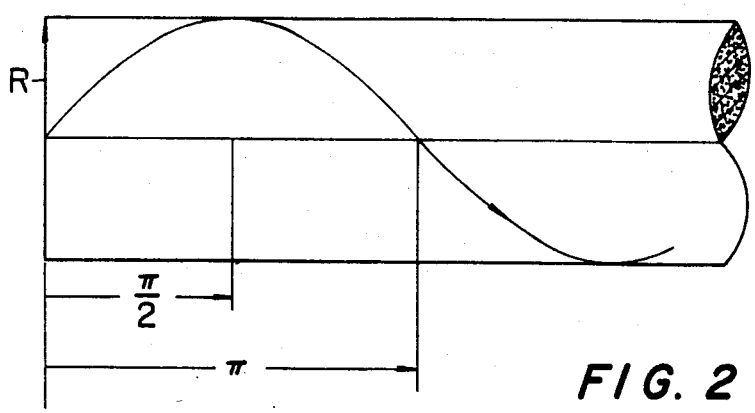
FIG. 1 shows the passage of light in the light-focusing heterogeneous medium.
Figure 2:
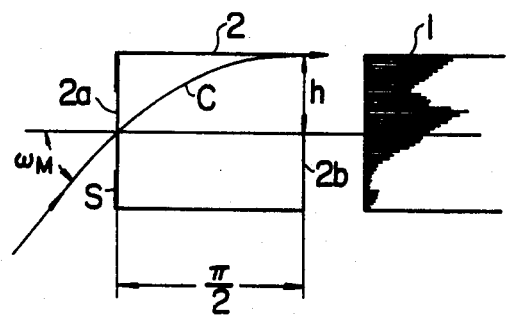
FIGS. 2 and 3 respectively show sectional views of respective embodiments of the present invention.

In the light-focusing heterogeneous medium for which the refractive index distribution is expressed by the formula $n = n_0(1 - \frac{1}{2} \alpha R^2)$, where the reference symbol $n_0$ represents the refractive index on the optical axis, reference symbol $\alpha$ represents a coefficient of refractive index distribution and reference symbol R represents the distance from the optical axis, the passage of light in the light-focusing heterogeneous medium becomes a sine curve as shown in FIG. 1. When such light-focusing heterogeneous medium 2 having the length equal to the length $D = \pi/2 \sqrt{\alpha}$, which is equivalent to $\frac{1}{4}$ cycle, i.e., $\pi/2$, is arranged in front of the optical fiber bundle 1 as shown in FIG. 2 and the stop S is arranged on the end face 2a on the entrance side of the light-focusing heterogeneous medium, the principal ray C goes out vertically to the end face 2b on the exit side of the light-focusing heterogeneous medium as shown in FIG. 2. In other words, the exit pupil is at the infinite distance. The optical system according to the present invention is arranged by providing a cylindrical light-focusing heterogeneous medium 2 at the distal end of the optical fiber bundle 1 as shown in FIG. 2.

For this kind of light-focusing heterogeneous medium, the maximum half field angle $\omega_M$ is expressed by the following formula when the outer diameter is represented by reference symbol $2h$.

$$\tan \omega_M = \frac{n_0 h \sqrt{\alpha}}{\{1 - (n_0^2 - 1)\alpha h^2\}^{\frac{1}{2}}}$$

Therefore, the maximum field angle is limited by the outer diameter etc.

Figure 3:
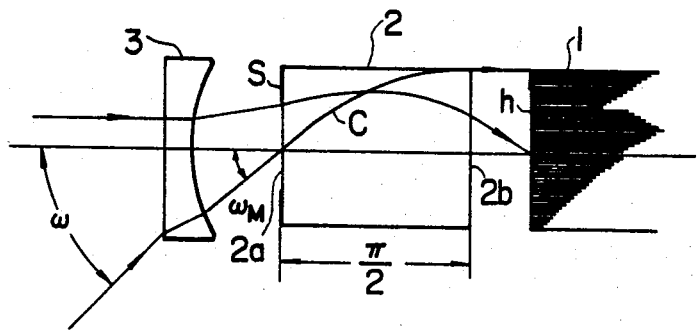

In order to obtain a still wider field angle, a negative lens 3 is arranged in the present invention on the object side of the light-focusing heterogenerous medium 2 as shown in FIG. 3. When the negative lens is arranged on the object side of the light-focusing heteronegeous medium as described in the above, the field angle of the optical system becomes wider and, moreover, it is possible to use the negative lens also as the cover glass. In that case, it is preferable to use a plano-concave lens as the negative lens as shown in FIG. 3. Besides, it is also possible to reduce the curvature of field and chromatic aberration by means of the negative lens.

As for curvature of field, Petzval's sum showing the curvature of field is expresed by the following formula as it is known widely.

$$P = \sum_i \frac{1}{n_i f_i}$$

In case of the optical system consisting only of the light-focusing heterogeneous medium, the refractive power is always of positive value and, therefore, it is not possible to make the value P small. When, however, the negative lens is added as shown in FIG. 3, it is possible to make the value P small and, consequently, it is possible to remarkably reduce the curvature of field. When the focal length of the added negative lens 3 is represented by reference symbol $f_0$, the focal length of the optical system as a whole is represented by reference symbol $f_t$ and magnification of the light-focusing heterogeneous medium is represented by reference symbol $\beta$, their relation becomes $f_t = f_0|\beta|$. If $f_t$ does not change, $f_0$ becomes small when $|\beta|$ becomes large. In that case, the curvature of field will be overcorrected. Moreover, the distance from the end face $2b$ to the image surface becomes large and it is not desirable for the optical system for endoscopes. When, on the contrary, $|\beta|$ is too small, $f_0$ becomes large and it will become impossible to make the field angle wide. Taking the above into consideration, it is preferable that the value of $\beta$ is $0.04 < |\beta| < 0.7$.

Chromatic aberration of the optical system according to the present invention becomes as explained below. In case of ordinary lens systems, Abbe's number $\nu_d$ is used. $\nu_d$ is expressed by the formula:

$$\frac{1}{\nu_d} = \frac{n_C - n_F}{n_d - 1}$$

In case of a thin lens, the achromatic condition for paraxial rays is expressed as follows.

$$\frac{1}{\nu_d} \approx \frac{(\frac{1}{f})_F - (\frac{1}{f})_C}{(\frac{1}{f})_d}$$

On the other hand, in case of light-focusing heterogeneous medium, $\mu_d$ expressed by the following formula is used as the parameter corresponding to Abbe's number.

$$\frac{1}{\mu_d} = \frac{K_F - K_C}{K_d}$$

where, $K_d = \frac{1}{2}\alpha_d n_{0d}$

In case of the light-focusing heterogeneous medium corresponding to a thin lens, the achromatic condition for paraxial rays is expressed as follows.

$$\frac{1}{\mu_d} \approx \frac{(\frac{1}{f})_F - (\frac{1}{f})_C}{(\frac{1}{f})_d}$$

Generally, the parameter $\mu_d$ is of positive value and the light-focusing heterogenerous medium has chromatic aberration similar to that of ordinary lenses. Therefore, it is possible to treat the light-focusing heterogeneous medium based on the same idea as the ordinary achromatic lenses and, consequently, chromatic aberration is reduced when the negative lens is added as shown in FIG. 3. In case of ordinary lenses, chromatic aberration is expressed by the following parameter.

$$\Delta = \Sigma \frac{1}{\nu_i f_i}$$

When the above parameter is applied to the optical system according to the present invention for convenience' sake, it is possible to consider that chromatic aberration is small when $\Delta$ is small. To obtain an optical system for which chromatic aberration is favourably corrected in case of the embodiment of the present invention in which the negative lens is added, it is desirable that the value of $\Delta$ is $|\Delta| < 0.04$.

Numerical values of preferred examples of the optical system illustrated in FIG. 3 are as shown below.

EXAMPLE I

| | | | |
|---|---|---|---|
| $r_1 = \infty$ | | | |
| | $d_1 = 0.37$ | $n_d = 1.51633$ | $\nu_d = 64.1$ |
| $r_2 = 1.869$ | | | |
| | $d_2 = 0.2$ | | |
| $r_3 = \infty$ | | | |
| | $d_3 = 2.7$ | Light-focusing heterogeneous medium | $\mu_d = 22.8$ |
| $r_4 = \infty$ | | | |

Numerical values related to the light-focusing heterogeneous medium are as follows.

$n = n_0(1 - \frac{1}{2}\alpha R^2)$
$n_{0d} = 1.63$ , $\alpha_d = 0.338$
$f = 1$ , $\beta = 0.3$ , $\Delta = \Sigma_i \frac{1}{\nu_i f_i} = 0.0373$

Example II

| | | | |
|---|---|---|---|
| $r_1 = \infty$ | | | |
| | $d_1 = 0.37$ | $n_d = 1.69895$ | $\nu_d = 30.12$ |
| $r_2 = 2.53$ | | | |
| | $d_2 = 0.2$ | | |
| $r_3 = \infty$ | | | |
| | $d_3 = 2.7$ | Light-focusing heterogeneous medium | $\mu_d = 60.6$ |
| $r_4 = \infty$ | | | |

Figure 6A:
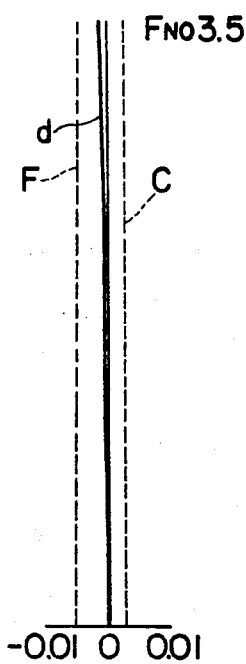
FIGS. 6A, 6B and 6C respectively show graphs illustrating aberration curves of Example II.
Figure 6B:
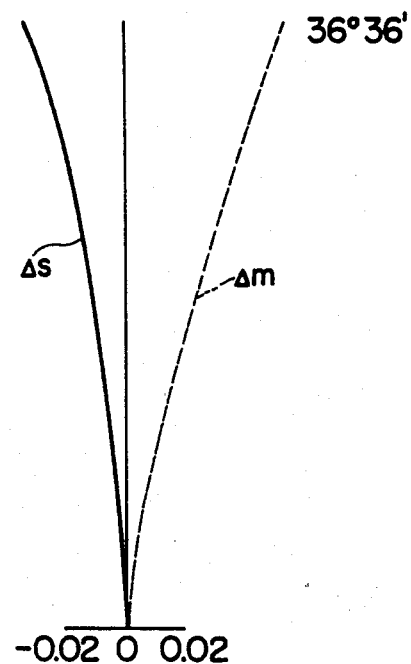
Figure 6C:
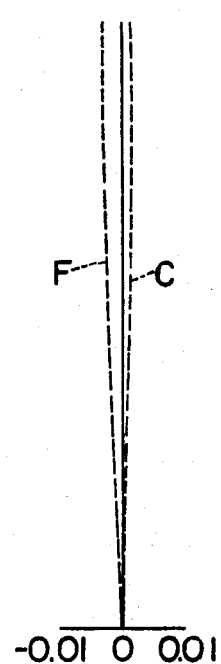

$n_{0d} = 1.63$ , $\alpha_d = 0.338$
$f = 1$ , $\beta = 0.3$ , $\Delta = \Sigma_i \frac{1}{\nu_i f_i} = 0.0065$ Aberrations curves of the above Example I are as shown in FIGS. 5A, 5B and 5C and aberrations curves of Example II are as shown in FIGS. 6A, 6B and 6C.

Figure 4:
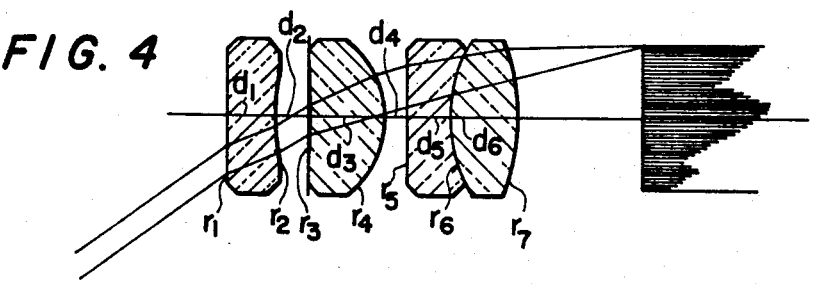
FIG. 4 shows a sectional view of a known objective optical system for endoscopes.

When an optical system, which has performance equivalent to the optical system according to the present invention, is arranged by using ordinary lenses, the lens configuration becomes for example as shown in FIG. 4 and numerical values of that lens system become as follows.

| | | | |
|---|---|---|---|
| $r_1 = \infty$ | | | |
| | $d_1 = 0.37$ | $n_1 = 1.51633$ | $\nu_1 = 64.15$ |
| $r_2 = 1.13$ | | | |
| | $d_2 = 0.36$ | | |
| $r_3 = -2.294$ | | | |
| | $d_3 = 0.6$ | $n_2 = 1.757$ | $\nu_2 = 47.87$ |
| $r_4 = -0.816$ | | | |
| | $d_4 = 0.2$ | | |
| $r_5 = \infty$ | | | |
| | $d_5 = 0.35$ | $n_3 = 1.84666$ | $\nu_3 = 23.88$ |
| $r_6 = 1.13$ | | | |
| | $d_6 = 0.61$ | $n_4 = 1.788$ | $\nu_4 = 47.49$ |
| $r_7 = -1.564$ | | | |
| $f = 1$ | | | |

Figure 7A:
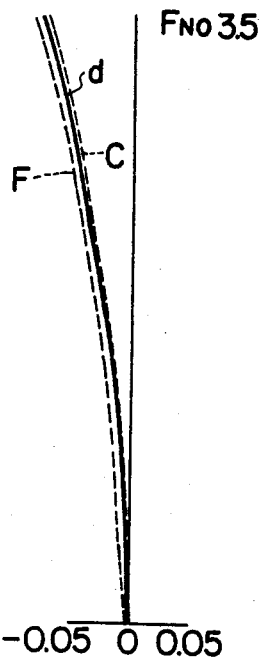
FIGS. 7A, 7B and 7C respectively show graphs illustrating aberration curves of known optical system shown in FIG. 4.
Figure 7B:
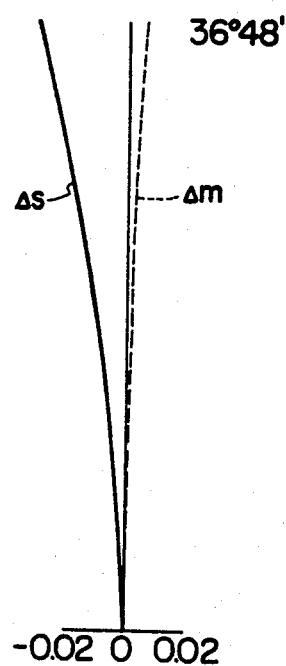
Figure 7C:
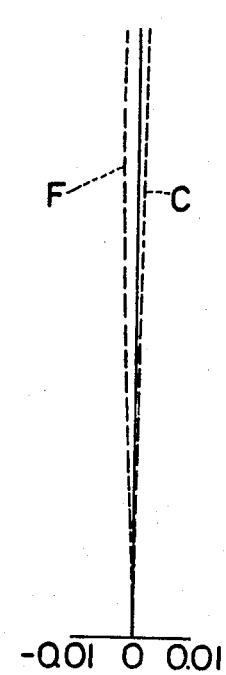

Aberration curves of the above example of lens system are as shown in FIGS. 7A, 7B and 7C.

As it is evident from FIG. 4 and the above example of numerical values, the lens configuration of the lens system becomes complicated when it is attempted to obtain the performance equivalent to the optical system according to the present invention by using ordinary lenses. As the objective for endoscopes should be arranged in a small limited space, it becomes necessary to produce a very small lens system of complicated configuration and it becomes very difficult to manufacture the lenses and to fix them properly. On the other hand, in the present invention, it is possible to manufacture and fix the optical system quite easily.

I claim:

1. An objective optical system for endoscopes comprising an optical fiber bundle for transmitting an image of an object and a cylindrical light-focusing heterogeneous medium arranged near the end face of said optical fiber bundle on the object side and having refractive index distribution $n$ given by the following formula:

$$n = n_0(1 - \tfrac{1}{2}\alpha R^2)$$

wherein reference symbol $n_0$ represents refractive index on the optical axis, reference symbol $\alpha$ represents the coefficient of refractive index distribution and reference symbol R represents the distance from the optical axis, said optical system further comprising a negative lens arranged on the object side of said light-focusing heterogeneous medium.

2. An objective optical system for endoscopes according to claim 1, in which said objective optical system for endoscopes has the following numerical values:

$r_1 = \infty$
$\quad d_1 = 0.37 \quad n_d = 1.51633 \quad \nu_d = 64.1$
$r_2 = 1.869$
$\quad d_2 = 0.2$
$r_3 = \infty$
$\quad d_3 = 2.7 \quad$ Light-focusing heterogeneous medium $\quad \mu_d = 22.8$
$r_4 = \infty$ wherein said light-focusing heterogeneous medium has the following numerical values.

$n = n_0(1 - \frac{1}{2} \alpha R^2)$
$n_{0d} = 1.63 \quad , \quad \alpha d = 0.338$
$f = 1 \quad , \quad \beta = 0.3 \quad , \quad \Delta = \sum_i \frac{1}{\nu_i f_i} = 0.0373$ 3. An objective optical system for endoscopes according to claim 1, in which said objective optical system for endoscopes has the following numerical values:

$r_1 = \infty$
$\quad d_1 = 0.37 \quad n_d = 1.69895 \quad \nu_d = 30.12$
$r_2 = 2.53$
$\quad d_2 = 0.2$
$r_3 = \infty$
$\quad d_3 = 2.7 \quad$ Light-focusing heterogeneous medium $\quad \mu_d = 60.6$
$r_4 = \infty$ wherein said light-focusing heterogeneous medium has the following numerical values.

$n = n_0(1 - \frac{1}{2} \alpha R^2)$
$n_{0d} = 1.63 \quad , \quad \alpha d = 0.338$
$f = 1 \quad , \quad \beta = 0.3 \quad , \quad \Delta = \sum_i \frac{1}{\nu_i f_i} = 0.0065$

* * * * *